No. 791,653. PATENTED JUNE 6, 1905.
J. K. ROUZE.
SELF PITCHER AND FEEDER FOR THRESHERS.
APPLICATION FILED MAY 19, 1904.
3 SHEETS—SHEET 3.
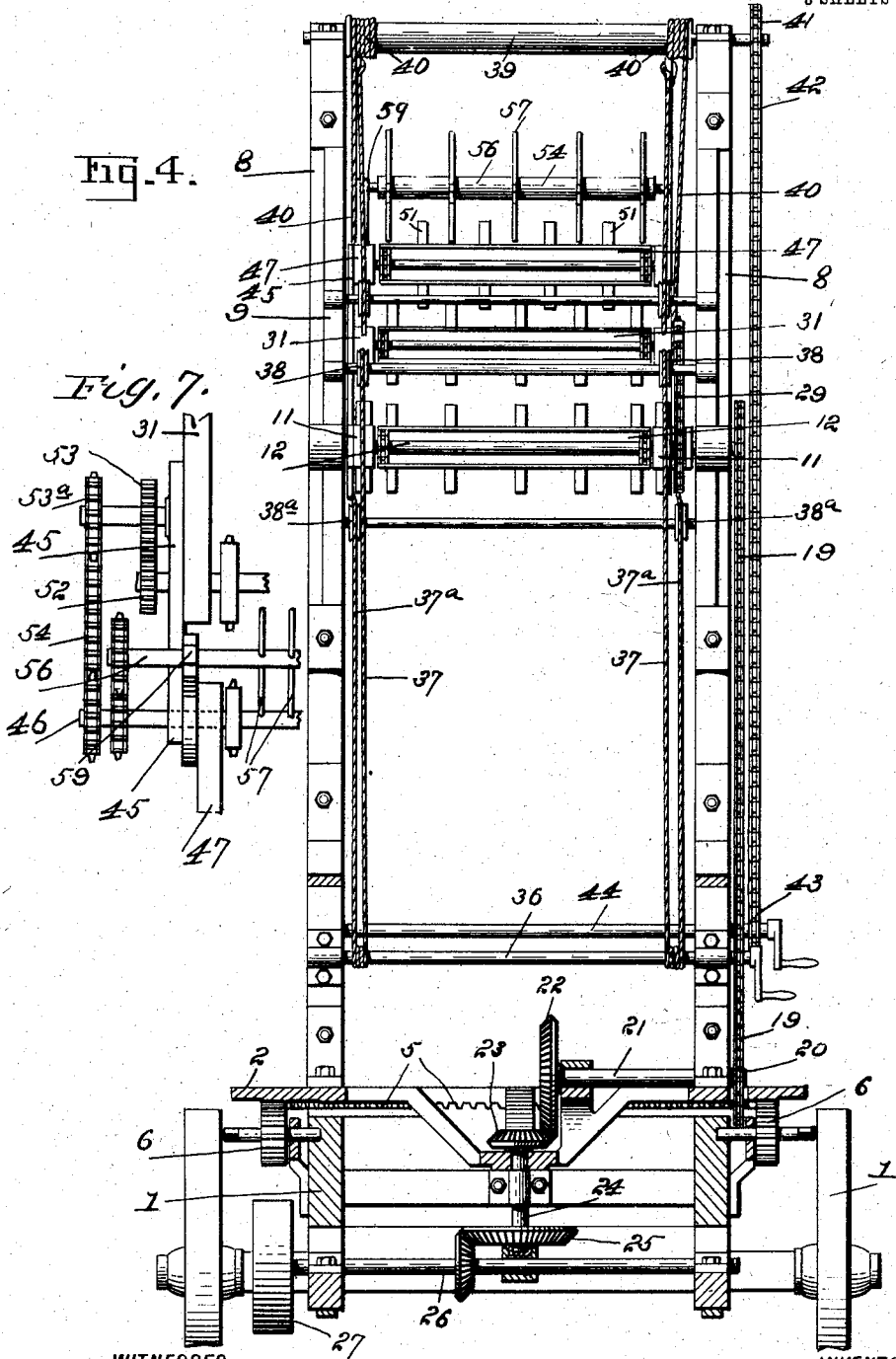
WITNESSES:
F. C. Gibson.
Nellie Yates
INVENTOR
J. K. Rouze
BY Davis & Davis
ATTORNEYS.

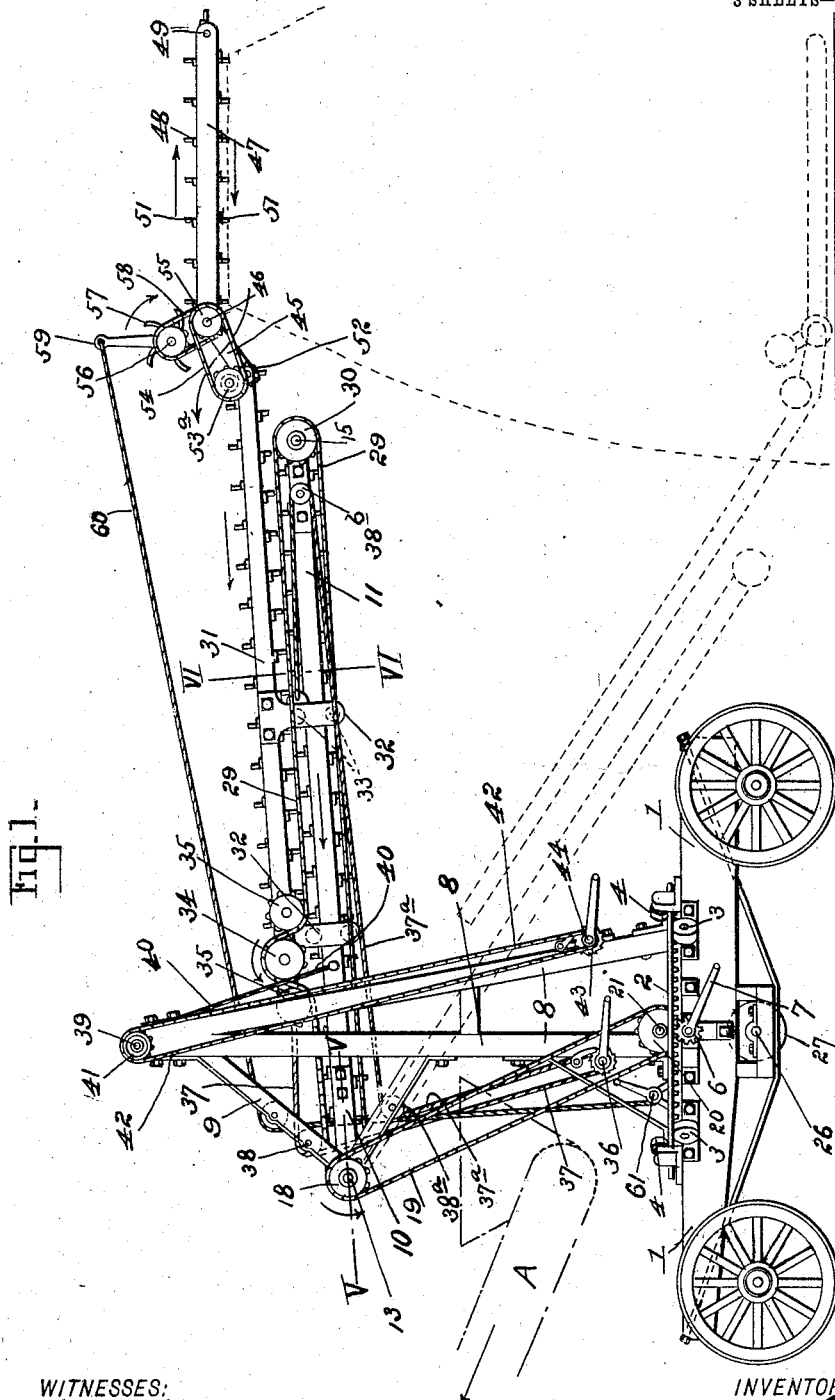

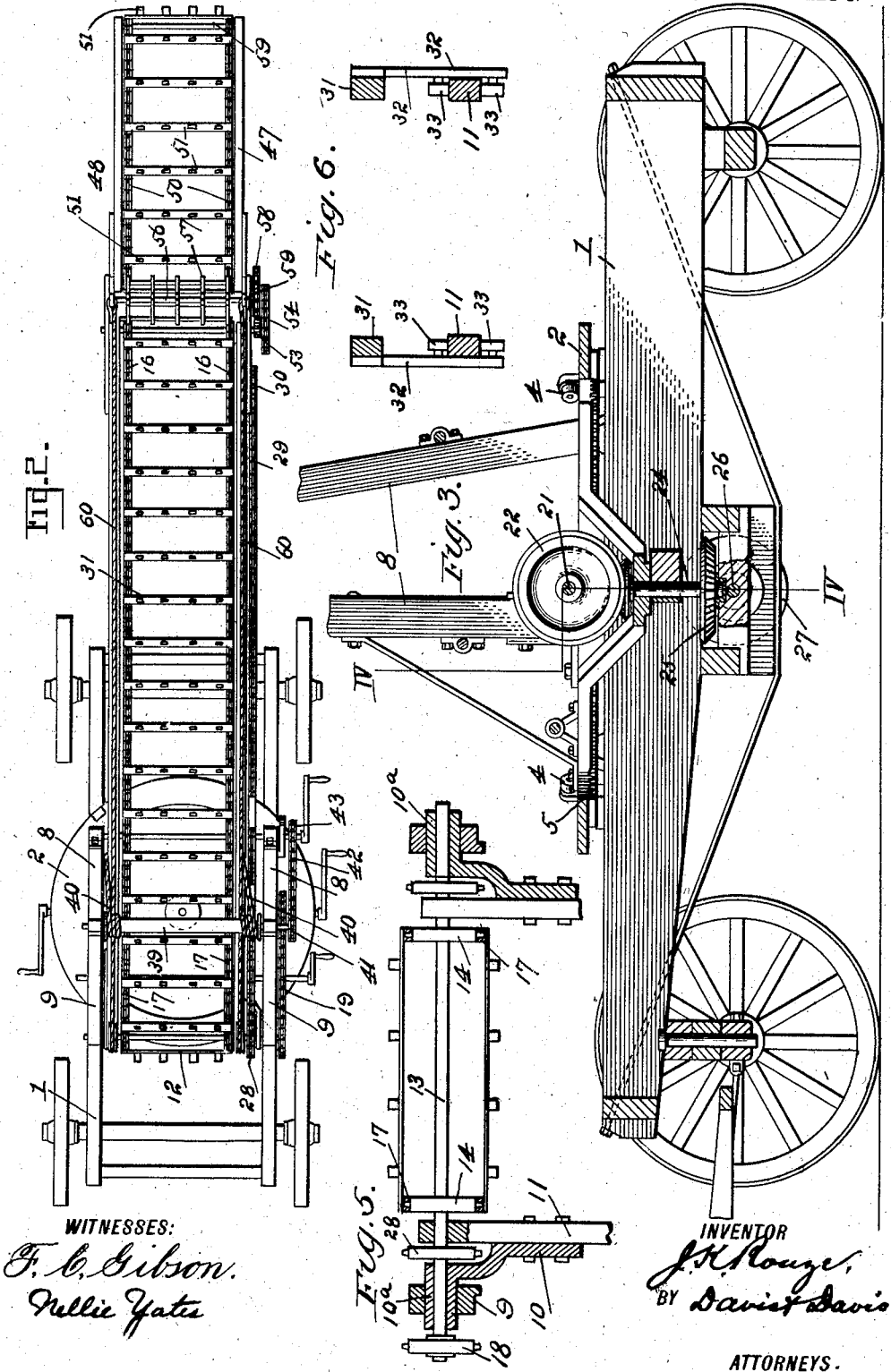

No. 791,653.

Patented June 6, 1905.

UNITED STATES PATENT OFFICE.

JOSEPH K. ROUZE, OF BELOIT, KANSAS.

SELF PITCHER AND FEEDER FOR THRESHERS.

SPECIFICATION forming part of Letters Patent No. 791,653, dated June 6, 1905.

Application filed May 19, 1904. Serial No. 208,705.

*To all whom it may concern:*

Be it known that I, JOSEPH K. ROUZE, a citizen of the United States, residing at Beloit, county of Mitchell, and State of Kansas, have invented certain new and useful Improvements in Self Pitchers and Feeders for Threshers, of which the following is a specification, reference being had therein to the accompanying drawings, in which—

Figure 1 is a side elevation of the machine; Fig. 2, a plan view thereof; Fig. 3, a longitudinally vertical sectional view of the supporting-truck; Fig. 4, a transverse sectional view taken on the line IV IV of Fig. 3, showing a part of the feeder in end elevation; Fig. 5, a detail horizontal sectional view on the line V V of Fig. 1; Fig. 6, a detail sectional view on the line VI VI of Fig. 1, and Fig. 7 a detail plan view of a portion of the machine.

The main object of this invention is to provide a machine which is adapted to take unthreshed grain from the stack or wagon and convey it to a threshing-machine.

A further object of the invention is to provide a machine for this purpose with carriers which may be raised or lowered and extended longitudinally in order to reach the grain to be fed to the thresher.

Another object of the invention is to mount the carriers and their adjusting mechanisms on a rotatable table in order that the carriers may be swung around to the desired position.

Other and equally important objects and advantages will appear hereinafter.

Referring to the various parts by numerals, 1 designates the truck which supports the carriers or conveyers, said truck being provided with suitable transporting-wheels. This truck is adapted to be adjusted or moved to the proper position with respect to the threshing-machine to permit the conveyers to deliver the grain at the receiving end of the thresher. On this truck is supported a strong turn-table or rotatable platform 2, said platform being supported by rollers 3, carried by the truck. Above the turn-table are arranged rollers 4, which bear on its upper surface and serve to retain it in place on the rollers 3. On the under side of the table is formed a circular rack 5, with which meshes small gears 6, said gears being suitably mounted on horizontal shafts. The outer ends of these shafts are squared to receive detachable cranks 7. From the foregoing it will be readily seen that by rotating the gears 6 the table or platform will be rotated as desired.

Mounted on the platform or table 2 are very strong upward-extending substantially A-shaped frames 8. Near the top of these frames are secured two rearward-extending angle-iron brackets 9. Journaled on the extreme rear ends of these brackets are two forward-extending carrier-supporting arms 10, whose forward ends are securely bolted to the outer sides of the bars 11 of the main carrier 12. Journaled in the carrier-supporting arms, concentric with and extending through the journals $10^a$ thereof, is a transverse carrier-shaft 13, on which, between the bars 11, are mounted two sprocket-wheels 14, one of said wheels being near each side bar 11. In the extreme forward end of the side bars 11 is mounted a transverse carrier-shaft 15, on which, near each side bar 11, is mounted a sprocket-wheel 16, over which run the endless carrier-chains 17. These chains are connected by transverse slats or strips, teeth or fingers being secured to these slats.

On one end of the shaft 13 is secured a sprocket-wheel 18, which is connected by a sprocket-chain 19 to a driving-sprocket 20 on the outer end of a radial shaft 21, mounted on the turn-table. On the inner end of this shaft 21 is a beveled gear 22, which meshes with a similar gear 23, secured to the upper end of a vertical shaft 24, which is mounted at the axial center of the turn-table. The object of this construction is obvious, as by it the conveyer mechanism will always remain in gear with the driving means during the rotation of the turn-table. On the lower end of the shaft 24 is a beveled gear 25, which meshes with a similar gear secured on the driving-shaft 26, this latter shaft being provided with a suitable driving-pulley 27. By connecting the driving-pulley 27 by a belt to a suitable power the carrier will be operated. On the shaft 13, between one of the arms 10 and the adjoining side bar 11 of the carrier, is rigidly secured a sprocket-wheel 28, over which runs an endless sprocket-chain 29. To the outer or forward end of the carrier 12 is journaled a sprocket-wheel 30, over which a chain 29 runs. Above the carrier 12 is arranged a carrier 31, the side bars of which are each provided with depending supporting-arms 32, which are arranged close to the sides of the bars 11 of the lower carrier. Each of these supporting-bars carries two bearing-rollers 33, one of which contacts with the upper side of the adjoining bar 11, the other bearing the lower side thereof. It will thus be seen that the upper carrier will be slidably supported on the side bars of the lower carrier. This upper carrier is provided at its ends with carrier-shafts having secured thereon sprocket-wheels on which the chains of the carrier run. On one end of the shaft, at the inner end of the upper carrier, is secured a chain-wheel 34, over which the chain 29 of the lower carrier runs, idlers 35 being arranged on each side thereof to hold the chain in mesh with the wheel 34 at all times. With this arrangement the upper carrier may be adjusted back and forth on the lower carrier without disturbing the driving connection of the upper carrier, said driving connection automatically adjusting itself to the changing position in the upper carrier.

Mounted on the frames 8 is a windlass 36, on which two ropes 37 are wound, one near each end thereof. One end of each of these ropes is carried up over a pulley 38, mounted in the frame 9 and secured to the inner end of the carrier 31. The other end of each of these ropes (designated as 37$^a$) is carried up over a pulley 38$^a$, mounted in the frame 9, thence forward over a pulley 38$^b$, mounted on the outer side of the bar 11 of the lower carrier, and thence inward to one of the bars 32 of the upper carrier. The windlass is provided with a suitable operating-crank and with a ratchet and pawl to hold it against accidental rotation. It will be readily understood that by rotating the windlass 36 one end of the rope 37 will be wound thereon and the other unwound and that the upper carrier will be moved inward or outward on the lower carrier, depending upon the direction of rotation of the windlass.

At the top of the frames 8 is journaled a windlass 39, on which, at each end thereof, is mounted a rope 40, each of said ropes being connected at their lower ends to the side bars 11 of the lower carrier forward of the frames 8. On one end of the windlass-shaft is rigidly secured a sprocket-wheel 41, over which runs a sprocket-chain 42, said chain also running over a similar wheel 43, secured to the shaft 44, mounted on the frames 8, at the lower end thereof. This shaft is provided with a crank, by which it may be rotated, and with a ratchet and pawl to prevent accidental rotation thereof. It is obvious that by rotating the shaft 44 to wind the ropes 40 on the windlass 39 or to unwind them therefrom the carriers may be swung upward or downward to the desired position.

To the outer ends of the side bars of the upper carrier are rigidly bolted upward and outward extending arms 45, in the outer ends of which is journaled a transverse shaft 46. On this shaft are pivotally supported side bars 47 of a grapple or picker device 48, in the outer ends of which is journaled a transverse shaft 49. The shafts 46 and 49 are provided with sprocket-wheels, over which run chains 50, said chains carrying transverse strips, to which are secured picking-fingers 51. The carrier-shaft at the forward end of the carrier 31 is provided with a gear-wheel 52, which meshes with a corresponding gear 53 on the end of a short shaft mounted in the side bar of said carrier, this latter shaft carrying a sprocket-wheel 53$^a$. Over this wheel 53$^a$ runs a chain 54, said chain meshing with a chain-wheel 55, mounted on the end of the carrier-shaft 46. By means of the gears 52 and 53 and the chain 54 the direction of movement of the stripper device will be the reverse of the movement of the carriers. The purpose of this will be obvious on reference to Fig. 1 of the drawings. In operation the bottom of the picker device is brought into contact with the top of the stack of grain which it is desired to convey to the threshing-machine, and the grain is picked up by the lower lap or portion of the endless stripper or grapple and carried inward toward the main carriers, said picker being lowered gradually as the grain is moved to the thresher to maintain the picker device in proper operative contact with the stack.

Above the picker, at the inner end thereof, is mounted a transverse stripper-shaft 56, which is provided with suitable stripping-fingers 57. This stripper-shaft is rotated by means of a chain 58 and suitable chain-wheels from the carrier-shaft 46, and its object is to strip the grain from the picker and force it upon the carrier 31 and in that way prevent it being carried forward on the upper lap or portion of the picker.

Secured rigidly to the side bars of the picker is an upward-extending arm 59, to the upper end of which is connected a rope 60, said rope passing rearward and over a pulley carried by the bracket 9 and thence to a windlass 61, carried by the table 2. By means of this windlass and rope the picker may be held in a horizontal position at all times without regard to the inclination of the carriers.

The feeder is arranged in such a position with respect to the thresher that the grain will be delivered from the inner end of the main carrier 12 to the receiving end of the thresher, this receiving end being shown at A in dotted lines in Fig. 1.

Having thus described my invention, what I desire to secure by Letters Patent is—

1. A thresher-feeder comprising a suitable support, a rotatable platform mounted thereon, upright frames secured to said platform, a main carrier pivoted at its inner end between said frames, a supplemental carrier mounted to slide on the main carrier, means for simultaneously driving both carriers, means for vertically adjusting the outer ends of the main and supplemental carriers, a picker device pivoted on the outer end of the supplemental carrier and above the supplemental carrier, means for driving the picker device and means for vertically adjusting the picker device.

2. A thresher-feeder comprising, a suitable support, a rotatable platform mounted thereon, a pair of upright frames secured on said platform, a main carrier pivoted at its inner ends in said frame, a driving-shaft mounted in the support below the rotatable platform, means connecting said driving-shaft to the main carrier for moving said carrier, a supplemental carrier mounted to slide on the main carrier, means to drive said supplemental carrier from the main carrier, a vertically-swinging picker device mounted on the outer end of the supplemental carrier, means for vertically adjusting the main and supplemental carriers, and means for vertically adjusting the picker device.

3. A thresher-feeder comprising a suitable support, a rotatable platform mounted thereon, upright frames secured to said platform, a main carrier pivoted at its inner end between said frames, a supplemental carrier mounted to slide on the main carrier, means for simultaneously driving both carriers, means for vertically adjusting the outer ends of the main and supplemental carriers, a picker device pivoted on the outer end of the supplemental carrier and above the supplemental carrier, means for driving the picker device, means for vertically adjusting the picker device, and means for adjusting the supplemental carrier on the main carrier.

4. A thresher-feeder comprising a suitable support, a rotatable platform mounted thereon, a main carrier supported by said platform, a supplemental carrier slidable on the main carrier, means for adjusting the supplemental carrier on the main carrier, upward and outward extending arms secured to the outer ends of the supplemental carrier, a vertically-swinging picker device pivoted at its inner end in said arms whereby the picker device will be slightly above the supplemental carrier, means for moving the carrier of the picker device in a direction reverse to the movement of the supplemental carrier, and means connected to the picker device and extending to the rotatable platform for vertically adjusting said picker device.

5. A thresher-feeder comprising a suitable support, a rotatable platform mounted thereon, a main carrier supported by said platform, a supplemental carrier slidable on the main carrier, means for adjusting the supplemental carrier on the main carrier, upward and outward extending arms secured to the outer ends of the supplemental carrier, a vertically-swinging picker device pivoted at its inner end in said arm whereby the picker device will be slightly above the supplemental carrier, means for moving the carrier of the picker device in a direction reverse to the movement of the supplemental carrier, and a stripper device above the picker and at the inner end thereof, and means for driving said stripper device.

6. A thresher-feeder comprising a suitable support provided with transporting-wheels, a rotatable platform mounted thereon, a vertical shaft at the axial center of said platform and forming the pivot therefor, a driving-shaft supported below the platform, a vertical support carried by the rotatable platform, a main carrier pivoted in said support, mechanism connecting said main carrier to the driving-shaft through the vertical shaft at the axial center of the rotatable platform whereby said carrier may be driven in any position of the rotatable platform, a supplemental carrier slidably mounted on the main carrier, means for driving said supplemental carrier from the main carrier, a picker device secured to the outer end of the supplemental carrier, and means for independently adjusting the picker device.

7. A thresher-feeder comprising a support, a rotatable platform mounted thereon, upright frames carried by said platform, a transverse shaft journaled in said frames, outward-extending side bars pivoted on said shaft, a transverse shaft at the outer ends of said side bars, main carrier-belts mounted on said transverse shafts, a supplemental carrier mounted to slide on the side bars of the main carrier, an endless driving-chain mounted on the main carrier and extending the entire length thereof, means whereby said driving-chain will move the supplemental carrier, means for adjusting the supplemental carrier on the main carrier without disconnecting said carrier from its driving-chain, a picker device pivotally supported at the outer end of the supplemental carrier, means for vertically adjusting the main and supplemental carriers and means for independently adjusting the picker device.

In testimony whereof I hereunto affix my signature, in the presence of two witnesses, this 16th day of May, 1904.

J. K. ROUZE.

Witnesses:
FRANK A. LUTZ,
AMZIE JORDAN.